US012471768B2

(12) United States Patent
Kono (10) Patent No.: US 12,471,768 B2
(45) Date of Patent: Nov. 18, 2025

(54) ENDOSCOPE SYSTEM, CONTROL DEVICE, METHOD OF CONTROLLING LIGHT SOURCE, AND COMPUTER-READABLE RECORDING MEDIUM (71) Applicant: OLYMPUS CORPORATION, Tokyo (JP)

(72) Inventor: Hidetaro Kono, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 414 days.

(21) Appl. No.: 18/085,125

(22) Filed: Dec. 20, 2022

(65) Prior Publication Data
US 2023/0136295 A1 May 4, 2023

Related U.S. Application Data (63) Continuation of application No. PCT/JP2020/027965, filed on Jul. 17, 2020.

(51) Int. Cl.
*A61B 1/267* (2006.01)
*A61B 1/00* (2006.01)
*A61B 1/06* (2006.01)

(52) U.S. Cl.
CPC ........ *A61B 1/2673* (2013.01); *A61B 1/00045* (2013.01); *A61B 1/0655* (2022.02)

(58) Field of Classification Search
None
See application file for complete search history.

(56) References Cited

U.S. PATENT DOCUMENTS

| 12,267,573 | B2* | 4/2025 | Talbert | A61B 1/00006 |
| 2013/0113970 | A1 | 5/2013 | Laser et al. | |
| 2017/0064178 | A1 | 3/2017 | Kagawa et al. | |
| 2017/0202431 | A1* | 7/2017 | Tanaka | G02B 23/26 |
| 2017/0208236 | A1* | 7/2017 | Yabe | A61B 1/0676 |
| 2017/0258307 | A1* | 9/2017 | Daidoji | A61B 1/00006 |

(Continued)

FOREIGN PATENT DOCUMENTS

| JP | S54-29520 A | 3/1979 |
| JP | 2009-219611 A | 10/2009 |

(Continued)

OTHER PUBLICATIONS

International Search Report dated Sep. 1, 2020 received in PCT/JP2020/027965.

*Primary Examiner* — Anh Tuan T Nguyen
*Assistant Examiner* — Jae Woo
(74) *Attorney, Agent, or Firm* — Scully, Scott, Murphy & Presser, P.C.

(57) ABSTRACT

An endoscope system includes: a light source configured to emit a pulse light; an imager configured to capture an image on a frame by frame basis; a processor configured to: determine a first Duty target value representing a Duty ratio of the pulse light to make an image that is captured in a next imaging frame have intended brightness; based on a frequency of vocal cords, determine a light emission period at a time when the pulse light is emitted; based on the first duty target value and the light emission period, determine a pulse width of the pulse light that is emitted next; and based on the light emission period and the pulse width, control the light source in light emission.

6 Claims, 9 Drawing Sheets (56) References Cited

U.S. PATENT DOCUMENTS

| | | | | |
|---|---|---|---|---|
| 2020/0345221 | A1* | 11/2020 | Yabe | A61B 1/00006 |
| 2020/0405141 | A1* | 12/2020 | Kono | A61B 1/0655 |
| 2021/0037176 | A1* | 2/2021 | Sato | G10L 25/03 |
| 2023/0136295 | A1* | 5/2023 | Kono | A61B 1/00009 |
| | | | | 600/160 |
| 2023/0414294 | A1* | 12/2023 | Shelton, IV | A61B 34/76 |
| 2024/0260811 | A1* | 8/2024 | Fujii | A61B 1/00009 |
| 2025/0024156 | A1* | 1/2025 | Yorozu | A61B 1/00006 |

FOREIGN PATENT DOCUMENTS

| | | |
|---|---|---|
| JP | 2016-052453 A | 4/2016 |
| JP | 6249909 B2 | 12/2017 |
| WO | 2015/194415 A1 | 12/2015 |

\* cited by examiner

ENDOSCOPE SYSTEM, CONTROL DEVICE, METHOD OF CONTROLLING LIGHT SOURCE, AND COMPUTER-READABLE RECORDING MEDIUM

CROSS-REFERENCE TO RELATED APPLICATION

This application is a continuation of International Application No. PCT/JP2020/027965, filed on Jul. 17, 2020, the entire contents of which are incorporated herein by reference.

BACKGROUND

1. Technical Field

The disclosure relates to an endoscope system that generates image data by applying illumination light to a subject and capturing an image, a control device, a method of controlling a light source, a computer-readable recording medium.

2. Related Art

A technique of performing stroboscopic observation on vocal cords of a subject, such as a human or an animal, that move fast by causing emission of white light intermittently has been known (for example, refer to Japanese Patent No. 6249909). In this technique, the vocal cords that move fast are observed in a stopped manner or in slow motion by sensing a frequency of vibrations of the vocal cords with a microphone, or the like, and applying a shot-pulse light that synchronizes with the frequency to the vocal cords.

The frequency of vocal cords around 60 to 1000 Hz in general. For this reason, in stroboscopic observation, the endoscope system applies approximately 1 to 16 pulse lights for one frame (for example, 60 hz is assumed) that the imager captures and the total exposure serves as a brightness of one frame (multi-exposure system).

There is, as a dimming control method in pulse light emission, a method of adjusting a Duty ratio by changing a pulse width or a light emission period and adjusting a total amount of applied light for one frame. In stroboscopic observation, because the light emission period is determined by the frequency of vibrations of vocal cords, pulse width modulation (PWM) control of adjusting a pulse width of a pulse light is performed.

SUMMARY

In some embodiments, an endoscope system includes: a light source configured to emit a pulse light; an imager configured to capture an image on a frame by frame basis; a processor configured to: determine a first Duty target value representing a Duty ratio of the pulse light to make an image that is captured in a next imaging frame have intended brightness; based on a frequency of vocal cords, determine a light emission period at a time when the pulse light is emitted; based on the first duty target value and the light emission period, determine a pulse width of the pulse light that is emitted next; and based on the light emission period and the pulse width, control the light source in light emission. As for the first Duty target value, in a case of a first pulse in the imaging frame, the first Duty target value is determined based on brightness of an image that is previously acquired, in a case of a different pulse after the first pulse in the imaging frame, an error between a second. Duty target value of a pulse light that is emitted one time before and a Duty control value representing an actual Duty ratio of the pulse light that is emitted one time before, and based on the second Duty target value and the error, the first Duty target value is determined.

In some embodiments, provided is a control device configured to control a light source configured to emit a pulse light. The control device includes: a processor configured to: determine a first Duty target value representing a Duty ratio of the pulse light to make an image that is captured in a next imaging frame have intended brightness; based on a frequency of vocal cords, determine a light emission period at a time when the pulse light is emitted; based on the first duty target value and the light emission period, determine a pulse width of the pulse light that is emitted next; and based on the light emission period and the pulse width, control the light source in light emission. As for the first Duty target value, in a case of a first pulse in the imaging frame, the first Duty target value is determined based on brightness of an image that is previously acquired, in a case of a different pulse after the first pulse in the imaging frame, an error between a second Duty target value of a pulse light that is emitted one time before and a Duty control value representing an actual Duty ratio of the pulse light that is emitted one time before, and based on the second Duty target value and the error, the first Duty target value is determined.

In some embodiments, provided is a method of controlling a light source configured to emit a pulse light. The method includes: determining a first Duty target value representing a Duty ratio of the pulse light to make an image that is captured in a next imaging frame have intended brightness; based on a frequency of vocal cords, determining a light emission period at a time when the pulse light is emitted; based on the first duty target value and the light emission period, determining a pulse width of the pulse light that is emitted next; and based on the light emission period and the pulse width, controlling the light source in light emission. As for the first Duty target value, in a case of a first pulse in the imaging frame, the first Duty target value is determined based on brightness of an image that is previously acquired, in a case of a different pulse after the first pulse in the imaging frame, an error between a second Duty target value of a pulse light that is emitted one time before and a Duty control value representing an actual Duty ratio of the pulse light that is emitted one time before, and based on the second Duty target value and the error, the first Duty target value is determined.

In some embodiments, provided is a non-transitory computer-readable recording medium with an executable program stored thereon. The program causes a processor to execute: determining a first Duty target value representing a Duty ratio of the pulse light to make an image that is captured in a next imaging frame have intended brightness; based on a frequency of vocal cords, determining a light emission period, at a time when the pulse light is emitted; based on the first duty target value and the light emission period, determining a pulse width of the pulse light that is emitted next; and based on the light emission period and the pulse width, controlling the light source in light emission. As for the first Duty target value, in a case of a first pulse in the imaging frame, the first Duty target value is determined based on brightness of an image that is previously acquired, in a case of a different pulse after the first pulse in the imaging frame, an error between a second Duty target value of a pulse light that is emitted one time before and a Duty control value representing an actual Duty ratio of the pulse light that is emitted one time before, and based on the second Duty target value and the error, the first Duty target value is determined.

The above and other features, advantages and technical and industrial significance of this disclosure will be better understood by reading the following detailed description of presently preferred embodiments of the disclosure, when considered in connection with the accompanying drawings.

DETAILED DESCRIPTION

Modes for carrying out the disclosure ("embodiments" below) will be described in detail below with the accompanying drawings. The following embodiments do not limit the disclosure. Each of the drawings referred to in the following description only schematically presents shapes, sizes, and a positional relationship to an extent such that the content of the disclosure is understandable. In other words, the disclosure is not limited to only the shapes, the sizes, and the positional relationship that are exemplified in each of the drawings. Furthermore, as for the illustration of the drawings, description is given with the same reference numerals being assigned to the same elements. Furthermore, an endoscope system that observes vocal cords of a living organism will be described as an example of a medical observation system according to the disclosure. As for the illustration of the drawings, description is given with the same reference numerals being assigned to the same elements.

First Embodiment

Schematic Configuration of Endoscope System

Figure 1:
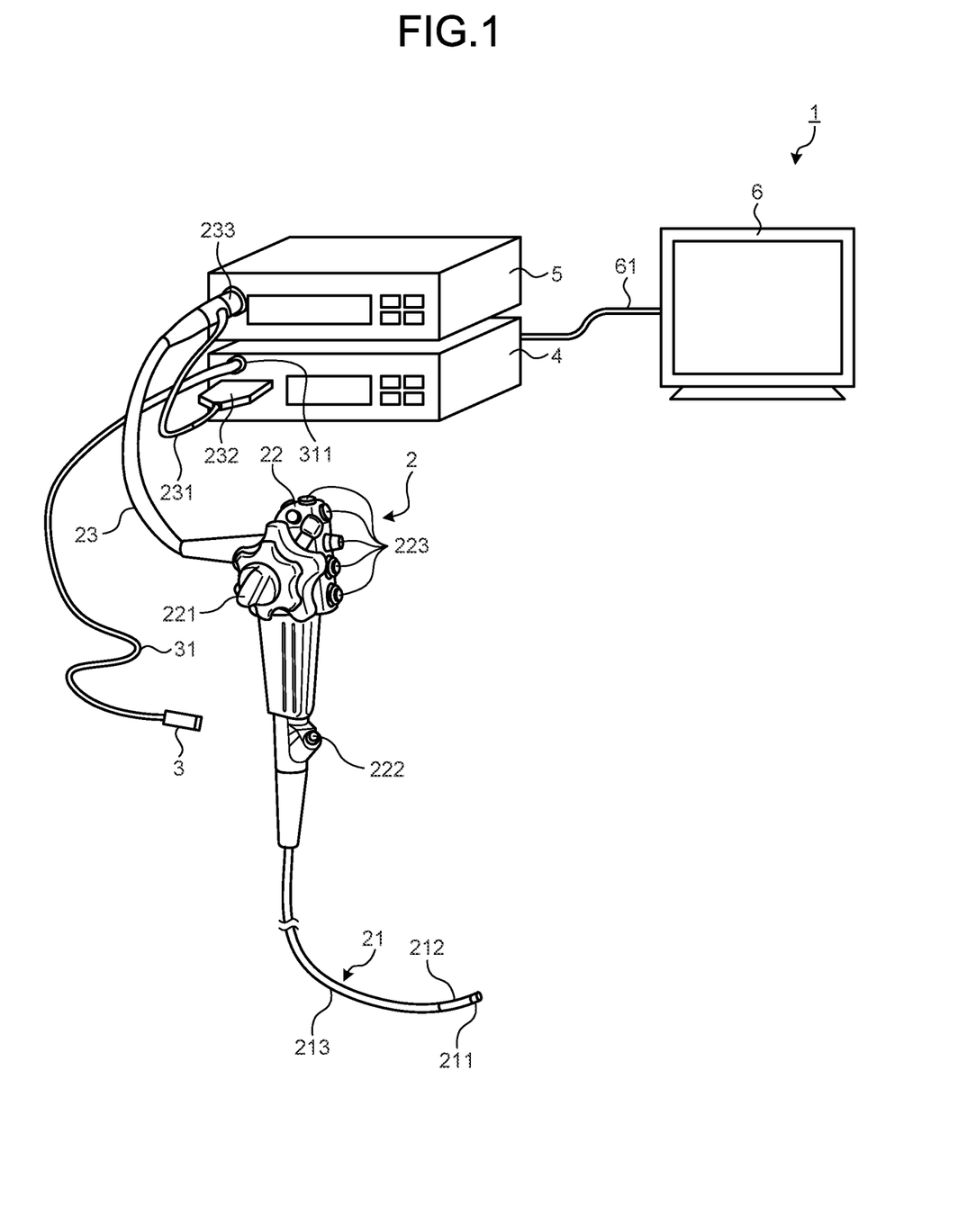
FIG. 1 is a schematic diagram illustrating a schematic configuration of an endoscope system according to a first embodiment.

FIG. 1 is a schematic diagram illustrating a schematic configuration of an endoscope system according to a first embodiment. An endoscope system 1 illustrated in FIG. 1 is used in medical fields and is a system fiat is inserted into the oral cavity and the inside of a subject that is a living organism, such as a human or an animal, (into the living organism) and that displays a captured image of the inside or the vocal cords, thereby observing the subject. Note that, in the first embodiment, a flexible endoscope system is described as the endoscope system 1; however, the endoscope system 1 is not limited to this and the endoscope system 1 may be, for example, a rigid endoscope system or an industrial endoscope system.

The endoscope system 1 illustrated in FIG. 1 includes an endoscope 2 that is inserted into the oral cavity of a subject, that captures an image of vocal cords and the oral cavity of the subject, and that generates an imaging signal of the image of the inside of the subject; an audio input device 3 to which a sound that is made by the subject is input; a control device 4 that performs given image processing on the imaging signal that is generated by the endoscope 2 and that controls each unit of the endoscope system 1; a light source device 5 that supplies, to the endoscope 2, illumination light to be emitted to the subject; and a display device 6 that displays an image (observation image) corresponding to an image signal that is generated by the control device 4 by performing the image processing.

First of all, the endoscope 2 will be described. The endoscope 2 includes an insertion unit 21 that is inserted into the subject, an operation unit 22 that is on the side of a proximal end of the insertion unit 21 and that an operator holds, and a universal cord 23 that extends from the operation unit 22 and that is flexible.

The insertion unit 21 is realized using an illumination fiber (light guide cable), an electronic cable, etc. The insertion unit 21 includes a distal end part 211 having an imaging unit that incorporates an imager that captures an image of the inside of the subject, a curve part 212 that is flexible and that consists of a plurality of curve members, and a flexible tube 213 that is flexible and that is provided on the side of a proximal end part of the curve part 212. The distal end part 211 is provided with an illuminator that illuminates the inside of the subject via an illumination lens, an observation unit that captures an image of the inside of the subject, an opening that communicates with a treatment tool channel, and an air supply and water supply nozzle (not illustrated in the drawings).

The operation unit 22 includes a curve knob 221 that causes the curve part 212 to curve vertically and horizontally; a treatment tool insertion unit 222 through which a treatment tool, such as biological forceps or a laser scalpel, is inserted into a body cavity of the subject; and a plurality of switch parts 223 for operating peripherals, such as the control device 4, the light source device 5, an air supply device, a water supply device, and a gas supply device. The treatment tool that is inserted from the treatment tool insertion unit 222 comes out of the opening at the distal end of the insertion unit 21 via the treatment tool channel that is provided inside.

The universal cord 23 is configured using an illumination fiber, an electronic cable, etc. The universal cord 23 bifurcates at the proximal end and the end of a branch cord 231 that is one of the branches is a connector 232 and the proximal end of the other branch is a connector 233. The connector 232 is detachable from the control device 4. The connector 233 is detachable from the light source device 5. The universal cord 23 transmits illumination light that is emitted from the light source device 5 to the distal end part 211 via the connector 232, the operation unit 22, and the flexible tube 213. The universal cord 23 transmits the signal of the image that is generated by the imaging unit provided in the distal end part 211 to the control device 4.

In the insertion unit 21 and the universal cord 23, an illumination fiber 214 (refer to FIG. 2) that guides the illumination light from the light source device 5 is arranged. One end of the illumination fiber 214 is positioned on a distal end face of the insertion unit 21 and the other end is positioned on a face of connection of the universal cord 23 to the light source device 5.

The audio input device 3 will be described next. An audio signal (audio data) that is made from the vocal cords of the subject from is input to the audio input device 3. A distal end of a cord 31 is connected to the audio input device 3 and a connector 311 at the proximal end is detachable from the control device 4. The audio input device 3 outputs the input audio signal to the control device 4 via the cord 31 and the connector 311. The audio input device 3 is configured using a microphone, an A/D conversion circuit, a gain-up circuit, etc. Note that, in the first embodiment, the audio input device 3 functions as an audio input portion.

The control device 4 will be described next. The control device 4 generates an image signal by performing given image processing on the imaging signal that is input from the endoscope 2 via the universal cord 23 and outputs the image signal to the display device 6. The control device 4 controls each unit of the endoscope system 1 based on various instruction signals that are transmitted from the switch parts 223 in the operation unit 22 of the endoscope 2 via the universal cord 23.

The light source device 5 will be described next. Under the control of the control device 4, the light source device 5 emits a white light or a special light that is used for narrow band imaging (NBI) observation and infrared light observation to the endoscope 2 via the connector 232 and the universal cord 23. Note that the light source device 5 and the control device 4 may be configured co communicate individually as illustrated in FIG. 1 or may be configured integrally.

The display device 6 will be described next. The display device 6 displays an image corresponding to the image signal that is input from the control device 4 via a video cable 61. The display device 6 displays various types of information on the endoscope system 1. The display device 6 is configured using a display using liquid crystals or electro luminescence (EL).

Detailed Configuration of Endoscope, Control Device and Light Source Device

Figure 2:
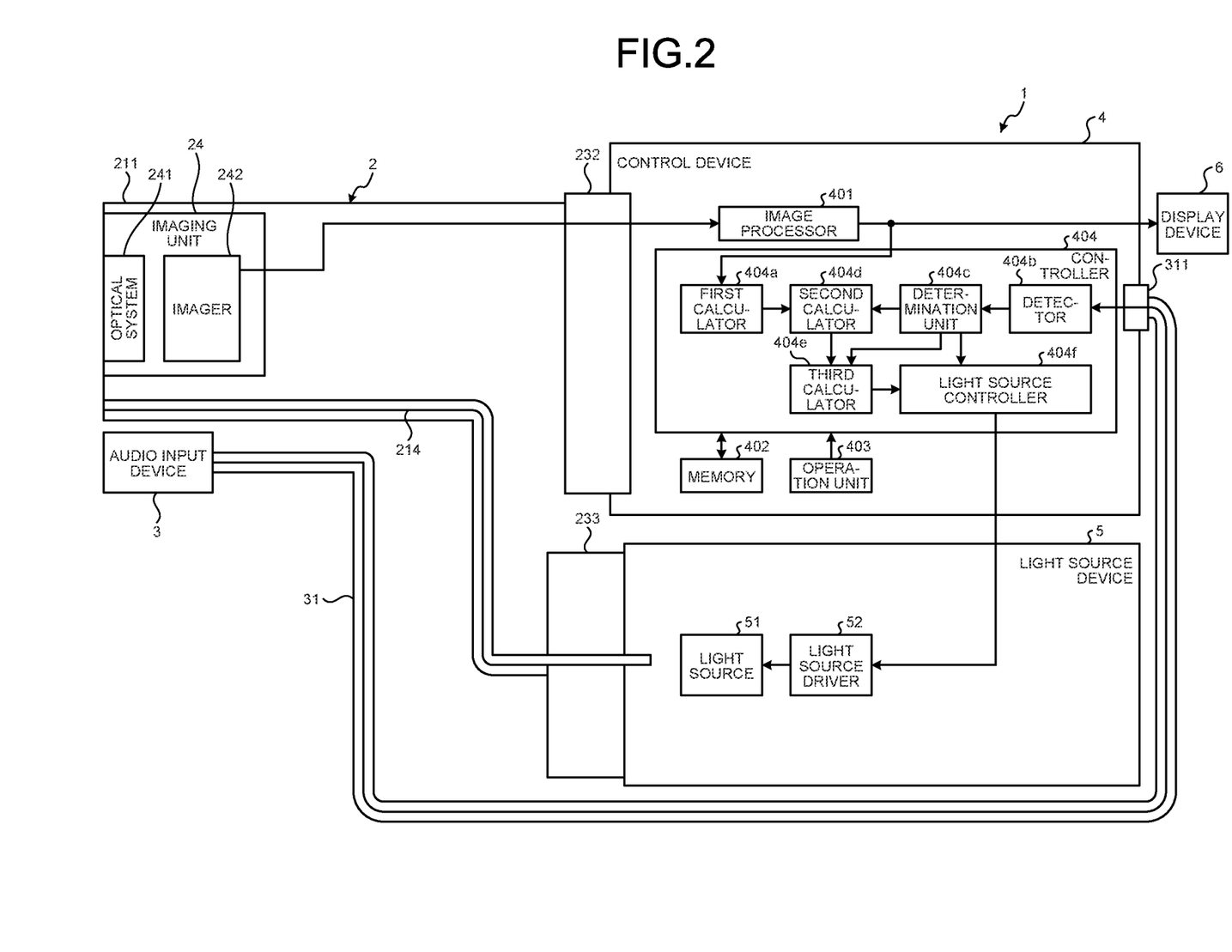
FIG. 2 is a block diagram illustrating functional configurations of an endoscope, a control device, and a light source device that the endoscope system according to a first embodiment includes.

Detailed functional configurations of the endoscope 2, the control device 4, and the light source device 5 will be described next. FIG. 2 is a block diagram illustrating the functional configurations of the endoscope 2, the control device 4, and the light source device 5.

Configuration of Endoscope

First of all, the configuration of the endoscope 2 will be described.

The endoscope 2 includes at least an imaging unit 24. The imaging unit 24 includes an optical system 241 and an imager 242.

The optical system 241 is realized using at least one lens, etc., and forms a subject image on a light receiving surface of the imager 242.

The imager 242 optically receives the subject image that is formed by the optical system 241 according to a given frame rate and outputs an imaging signal that is generated by performing photoelectric conversion to the control device 4 via a transmission cable and the connector 232 of the universal cord 23.

Configuration of Control Device

A configuration of the control device 4 will be described next.

The control device 4 includes an image processor 401, a memory 402, an operation unit 403, and a controller 404.

Under the control of the controller 404, the image processor 401 generates an image signal by performing the given image processing on the imaging signal that is input from the endoscope 2 and outputs the image signal to the display device 6. The given image processing is image processing containing at least A/D conversion processing, gain adjustment processing, optical black subtraction processing, and white balance (WB) adjustment processing, and, in the case where the imager 242 has a Bayer arrangement, concurrent processing, color matrix operation processing, gamma correction processing, color reproduction processing, and edge enhancement processing. The image processor 401 is configured using a processor including a memory, such as a volatile memory or a non-volatile memory, and hardware, such as a field programmable gate array (FPGA), an application specific integrated circuit (ASIC), and a graphics processing unit.

The memory 402 is realized using a volatile memory, a non-volatile memory, a frame memory, etc. The memory 402 records various programs that the endoscope system 1 executes and various types of data used during processing and an image corresponding to the image signal obtained by the image processor 401 by performing the image processing. Note that the memory 402 may be a memory card that is detachable from the control device 4, or the like.

The operation unit 403 receives an input of an operation of a user and outputs a signal corresponding to the received operation co the controller 404. The operation unit 403 is realized using a touch panel, a button, a jog dial, a switch, a foot switch, etc.

The controller 404 controls each unit configuring the endoscope system 1. The controller 404 is configured using a processor that includes hardware, such as a memory, a CPU, a FPGA, an ASIC, etc. The controller 404 includes a first calculator 404a, a detector 404b, a determination unit 404c, a second calculator 404d, a third calculator 404e, and a light source controller 404f.

The first calculator 404a calculates a brightness evaluation value of an image corresponding to a video signal that is input from the image processor 401 and outputs the brightness evaluation value to the second calculator 404d.

The detector 404b detects a frequency of audio data (frequency of vocal cords) that is input from the audio input device 3 via the cord 31 and the connector 311 and outputs a result of the detection to the determination unit 404c. The audio data is generated from the vocal cords of the living organism (subject).

Based on a frequency of vibrations of the living organism that is input from the detector 404b, the determination unit 404c determines a light emission period at the time when the light source device 5 emits a pulse light and outputs the light emission period to the second calculator 404d.

Based on the brightness evaluation value that is input from the first calculator 404a, the second calculator 404d calculates a Duty target value representing a Duty, ratio of the pulse light in the light source device 5 for making an image have intended brightness in the next frame of the imager 242 and outputs the Duty, target value to the third calculator 404e. The second calculator 404d calculates, as a target value, an average Duty ratio of the pulse light in the next frame of the imager 242.

Based on the Duty target value that is input from the second calculator 404d and the light emission period that is input from the determination unit 404c, the third calculator 404e calculates a pulse width of each pulse at the time when the light source device 5 causes emission of a pulse light. The third calculator 404e calculates a pulse width in a step size of an integral multiple (for example, 1 μsec) of a line period of the imager 242. The reason of this is that, for example, because of the circuit scale, or the like, such a restriction may occur. When there is such a restriction, the pulse width cannot be controlled freely (only discrete pulse widths are selectable). For this reason, the third calculator 404e calculates a pulse width in a step size of an integral multiple (for example, 1 μsec) of the line period of the imager 242, thereby calculating a pulse width that enables control at brightness much closer to the target.

The light source controller 404f controls the light source device 5 based on the light emission period that is input from the determination unit 404c and the pulse width that is input from the third calculator 404e.
Specifically, based on the light emission period that is input from the determination unit 404c and the pulse width that is input from the third calculator 404e, the light source controller 404f controls the pulse width at the time when a light source driver 52 of the light source device 5 to be described below emits a pulse light.

Configuration of Light Source Device

A configuration of the light source device 5 will be described next.

The light source device 5 includes a light source 51 and the light source driver 52.

The light source 51 perform pulse light emission at a given interval based on a PWM control signal that is input from the light source driver 52, thereby emitting a pulse light (illumination light) to the endoscope 2. The light source 51 is realized using at least one lens and a white light emitting diode (LED) lamp, etc. As for the light source 51, a transmission filter that transmits narrow band light of a given wavelength band (390 nm to 445 nm 530 nm to 550 nm) may be detachably provided on an optical path of the light source 51.

Under the control of the light source controller 404f, the light source driver 52 applies a pulse current value in a given pulse width at a given interval, thereby causing the light source 51 to emit a pulse light. The light source driver 52 is realized using a drive driver circuit, etc.

Process Executed by Endoscope System

Figure 3:
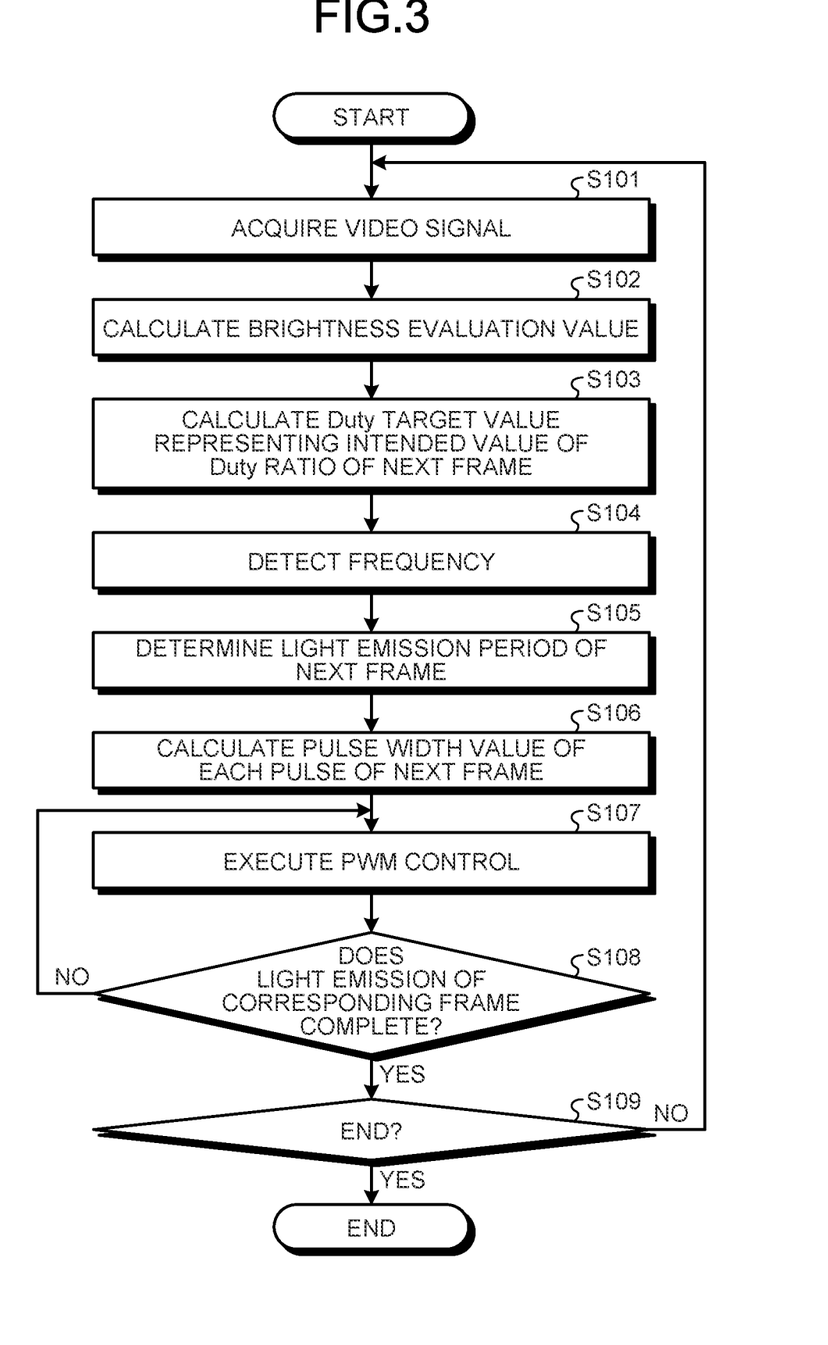
FIG. 3 is a flowchart illustrating an overview of a process that the endoscope system according to the first embodiment executes.
Figure 4:
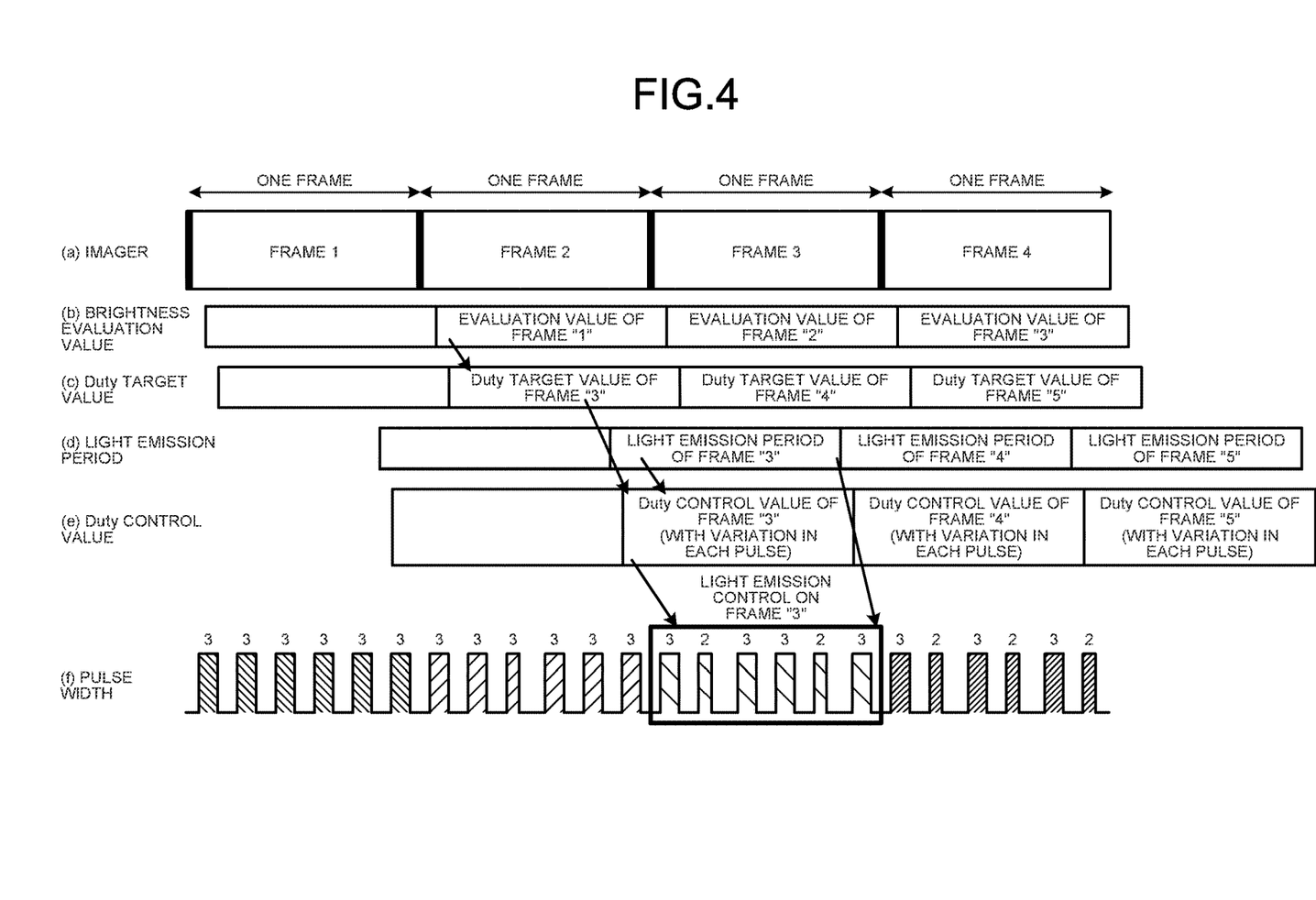
FIG. 4 is a timing chart illustrating an overview of pulse light emission that the endoscope system according to a first embodiment executes.

A process that is executed by the endoscope system 1 will be described next. FIG. 3 is a flowchart illustrating an overview of a process that the endoscope system 1 executes. FIG. 4 is a timing chart illustrating an overview of pulse light emission that the endoscope system 1 executes. In FIG. 4, from the top, (a) presents periods of one frame of images corresponding to a video signal that is generated by the imager 242, (b) presents brightness evaluation values, (c) presents Duty target values of the Duty ratio, (d) presents light emission periods, and (e) presents control values of the Duty ratio.

As illustrated in FIG. 3, first of all, the first calculator 404a acquires an image corresponding to an image signal obtained by performing image processing on a video signal that is acquired by the image processor 401 from the imager 242 of the endoscope 2 (step S101) and calculates a brightness evaluation value of the image corresponding to the image signal that is acquired from the image processor 401 (step S102).

Subsequently, based on the brightness evaluation value that is calculated by the first calculator 404a, the second calculator 404d calculates a Duty target value representing an aimed value of the Duty ratio of the next frame of the imager 242 (step S103).

Thereafter, the detector 404b detects a frequency of audio data that is input from the audio input device 3 (step S104).

Subsequently, based on the frequency that is detected by the detector 404b, the determination unit 404c determines a light emission period of the next frame of the imager 242 (step S105).

Thereafter, based on the Duty target value that is input from the second calculator 404d and the light emission period that is input from the determination unit 404c, the third calculator 404e calculates a pulse width of each pulse at the time when the light source device 5 causes emission of a pulse light (step S106). Specifically, as illustrated in FIG. 4, the third calculator 404e calculates a pulse width of each pulse in the next frame of the imager 242 such that the Duty target value that is calculated by the second calculator 404d is enabled. In this case, the third calculator 404e calculates a pulse width in a step size of an integral multiple (for example, 1 μsec) of a line period of the imager 242. The reason of this is that, for example, because of the circuit scale, or the like, such a restriction may occur. When there is such a restriction, the pulse width cannot be controlled freely (only discrete pulse widths are selectable). For this reason, by calculating a pulse width in a step size of an integral multiple (for example, 1 μsec) of the line period of the imager 242, the third calculator 404e calculates a pulse width that enables control at brightness much closer to the target. For example, in the case where a Duty target value (intended value) of a Duty ratio in a period of a frame "1" is "3%" and brightness (a brightness evaluation value) in a period of a frame "3" is changed from a total exposure of "18" in the period of the frame "1" to "16", the third calculator 404e calculates a pulse width of each pulse based on the light emission period such that the Duty target value is enabled. Specifically, as illustrated in FIG. 4, the third calculator 404e calculates that the number of times the Duty ratio is 3% is four times and the number of times the Duty ratio is 2% is twice in the period of the frame "3" of the imager 242. Accordingly, the average of the Duty target values in the period of the frame "3" is "2.67%". Thus, when the light emission period is "200 μsec", the third calculator 404e calculates that the pulse width corresponding to the Duty ratio of "3%" is "6 μsec" (0.03×200 μsec). Furthermore, when the light emission period is "200 μsec", the third calculator 404e calculates that the pulse width corresponding to the Duty ratio of "2%" is "4 μsec" (0.02×200 μsec).

Subsequently, the light source controller 404f outputs a PWM control signal to the light source driver 52, thereby executing PWM control (step S107). Specifically, the light source controller 404f causes the light source driver 52 to supply the PFM control signal in the pulse width of each pulse that is calculated by the third calculator 404e to the light source 51. More specifically, as illustrated in FIG. 4, the light source controller 404f causes the light source driver 52 to supply a PWM current in the pulse width of each pulse that is calculated by the third calculator 404e to the light source 51, thereby performing light emission with a duty ratio of "3%" for four times (performing light emission with a pulse width of 6 μsec for four times) and performing light emission with a duty ratio of "2%" twice (performing light emission with a pulse width of 4 μsec twice) in the period of the frame "3" of the imager 242. In this case, as illustrated in FIG. 4, the light source controller 404f causes the light source 51 to emit light with the duty ratio varying in the period of the frame "3" of the imager 242. Note that, in FIG. 4, when the average of the duty ratios in the third frame is "2.67%", the light source controller 404f may change the Duty ratio or change the order of light emission.

Subsequently, the controller 404 determines whether light emission for the corresponding frame of the imager 242 completes (step S108). When the controller 404 determines that light emission for the corresponding frame of the imager 242 completes (YES at step S108), the endoscope system 1 moves to step S109 to be described below. On the other hand, when the controller 404 determines that light emission for the corresponding frame of the imager 242 does not complete (NO at step S108), the endoscope system 1 returns to step S107 described above.

At step S109, the controller 404 determines whether an instruction signal for ending an examination on the living organism is input from the operation unit 403. When the controller 404 determines that the instruction signal for ending the examination on the living organism is input from the operation unit 403 (YES at step S109), the endoscope system 1 ends the process. On the other hand, when the controller 404 determines that the instruction signal for ending the examination on the living organism is not input from the operation unit 403 (NO at step S109), the endoscope system 1 returns to step S101 described above.

According to the first embodiment described above, because the light source controller 404f causes the light source driver 52 to supply the PNM current in the pulse width of each pulse in one frame of the imager 242, which is calculated by the third calculator 404e, to the light source 51, it is possible to obtain an observation image with brightness that is suitable for observation.

According to the first embodiment, because the third calculator 404e calculates a pulse width of each pulse in one frame based on the Duty target value representing the Duty ratio of the pulse light in the next frame of the imager 242, which is calculated by the second calculator 404d, and the light emission period, which is determined by the determination unit 404c, even if the Duty control by the light source controller 404f cannot ensure a resolution sufficiently, it is possible to perform consecutive dimming control without increasing or reducing the S/N ratio.

Second Embodiment

A second embodiment will be described next. The endoscope system 1 according to the first embodiment described above calculates a pulse width based on a light emission period and a target value and an endoscope system according to the second embodiment calculates a difference (carry over error) between a target value and a control value representing a Duty ratio enabling a light source controller to control a light source, reflects the difference to the target value, and updates the target value, thereby calculating a pulse width of each pulse. A configuration of the endoscope system according to the second embodiment will be described and thereafter a process that the endoscope system according to the second embodiment executes will be described below. Note that the same reference numerals are assigned to the same elements as those of the endoscope system 1 according to the first embodiment described above and detailed description will be omitted.

Detailed Configuration of Control Device

Figure 5:
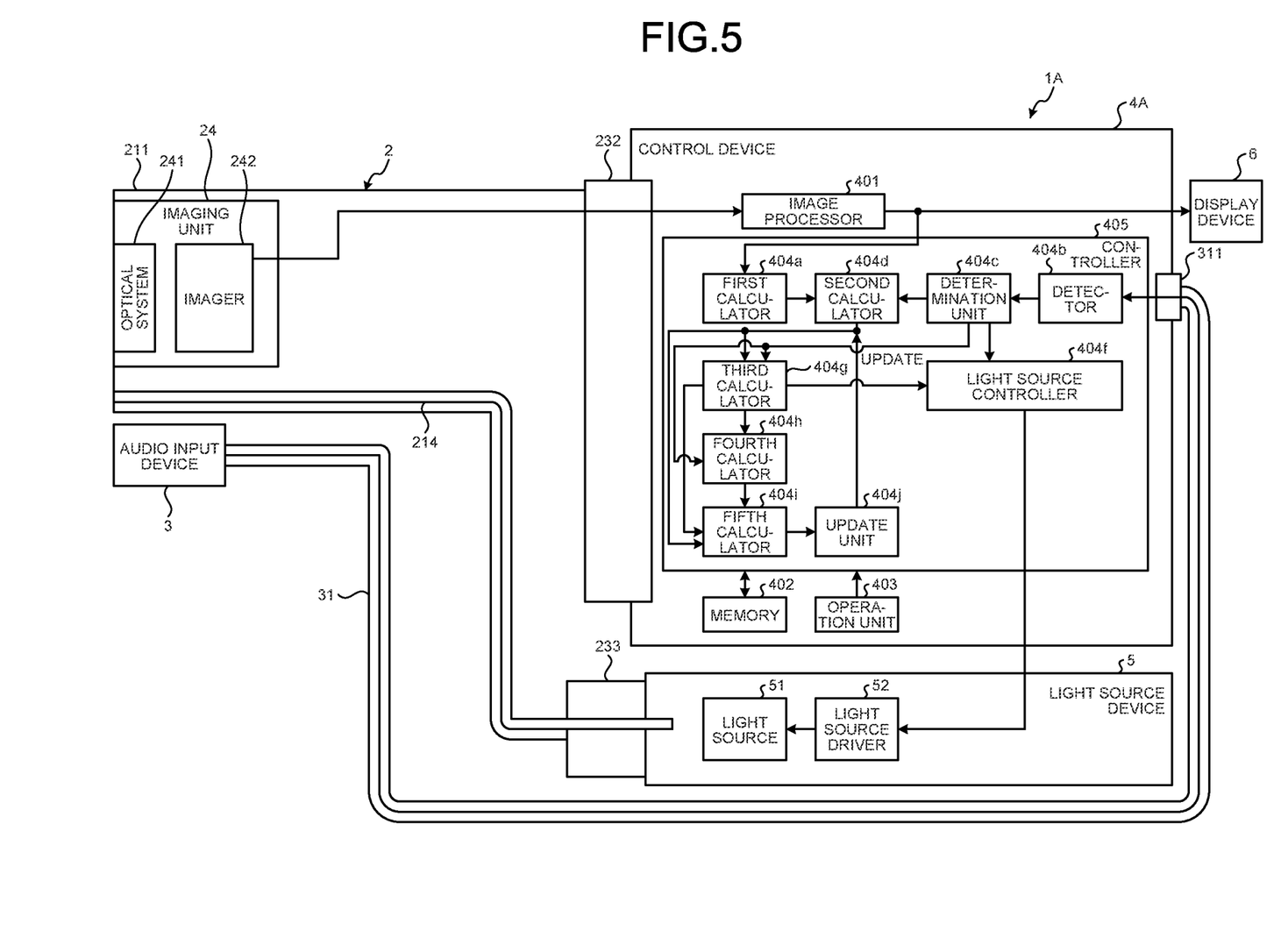
FIG. 5 is a block diagram illustrating functional configurations of an endoscope, a control device, and a light source device that an endoscope system according to a second embodiment includes.

FIG. 5 is a block diagram illustrating functional configurations of the endoscope 2, a control device 4A, and a light source device 5 that the endoscope system according to the second embodiment includes. An endoscope system 1A illustrated in FIG. 5 includes the control device 4A instead of the control device 4 according to the endoscope system 1 according to the first embodiment described above.

The control device 4A includes a controller 405 instead of the controller 404 according to the above-described first embodiment. The controller 405 includes, in addition to the elements of the controller 404 according to the above-described first embodiment, a third calculator 404g, a fourth calculator 404h, a fifth calculator 404i, and an update unit 404j.

The third calculator 404g calculates a pulse width of each pulse at the time when the light source device 5 causes emission of a pulse light based on a target value that is input from the second calculator 404d and a light emission period that is input from the determination unit 404c and outputs the pulse width to the light source controller 404f. The third calculator 404g calculates a pulse width at the time when the light source 51 emits a pulse light next based on the target value that is updated by the update unit 404j with respect to each pulse and the light emission period that is determined by the determination unit 404c and outputs the pulse width to the light source controller 404f.

The fourth calculator 404h calculates a Duty control value at the time when the light source controller 404f actually controls the light source 51 with respect to each pulse based on the pulse width at the time when the light source controller 404f causes the light source 51 to emit a pulse light and the light emission period that is determined by the determination unit 404c and outputs the control value of each pulse to the fifth calculator 404i.

The fifth calculator 404i calculates an error (carry over error) between a Duty target value that is calculated by the second calculator 404d and the Duty control value that is calculated by the fourth calculator 404h with respect to each pulse and outputs the error of each pulse to the update unit 404j.

Based on the error that is calculated by the fifth calculator 404i, the update unit 404j corrects (makes a reflection to) the Duty target value at the time when the light source 51 emits a pulse light next with respect to each pulse, thereby updating the Duty target value.

Process Executed by Endoscope System

Figure 6:
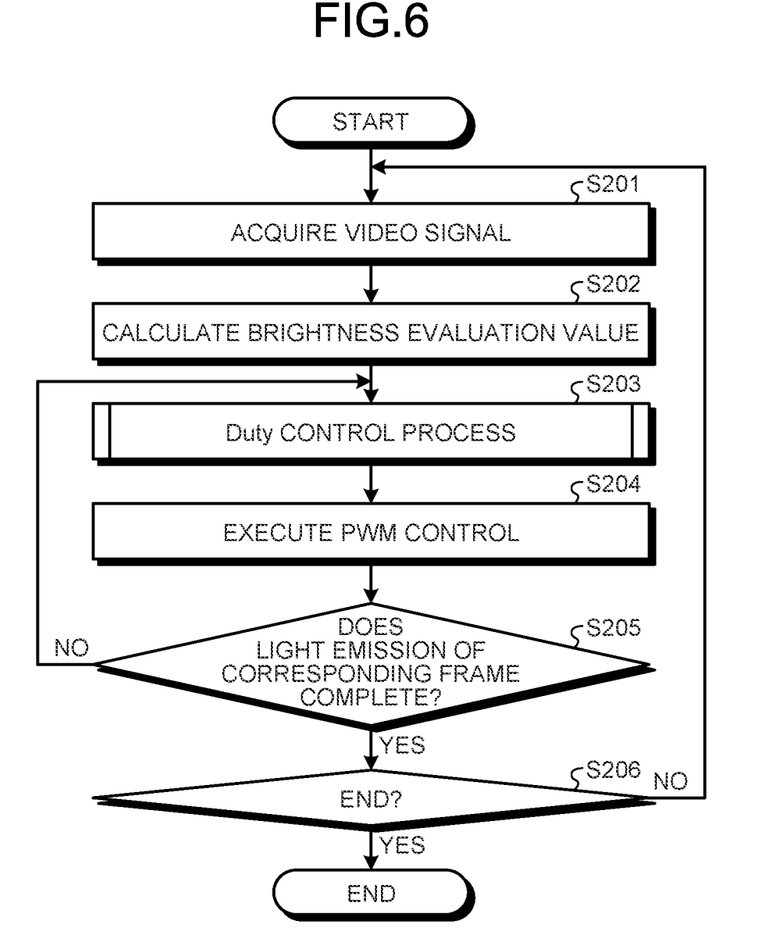
FIG. 6 is a flowchart illustrating an overview of a process that the endoscope system according to the second embodiment executes.

A process that the endoscope system 1A executes will be described next. FIG. 6 is a flowchart illustrating an overview of the process that the endoscope system 1A executes.

As illustrated in FIG. 6, first of all, the first calculator 404a acquires an image corresponding to an image signal obtained by performing image processing on a video signal that is acquired by the image processor 401 from the imager 242 of the endoscope 2 (step S201) and calculates a brightness evaluation value of the image corresponding to the image signal that is acquired from the image processor 401 (step S202).

Subsequently, the controller 405 performs a Duty control process for performing PWM control on the light source device 5 (step S203).

Duty Control Process

Figure 7:
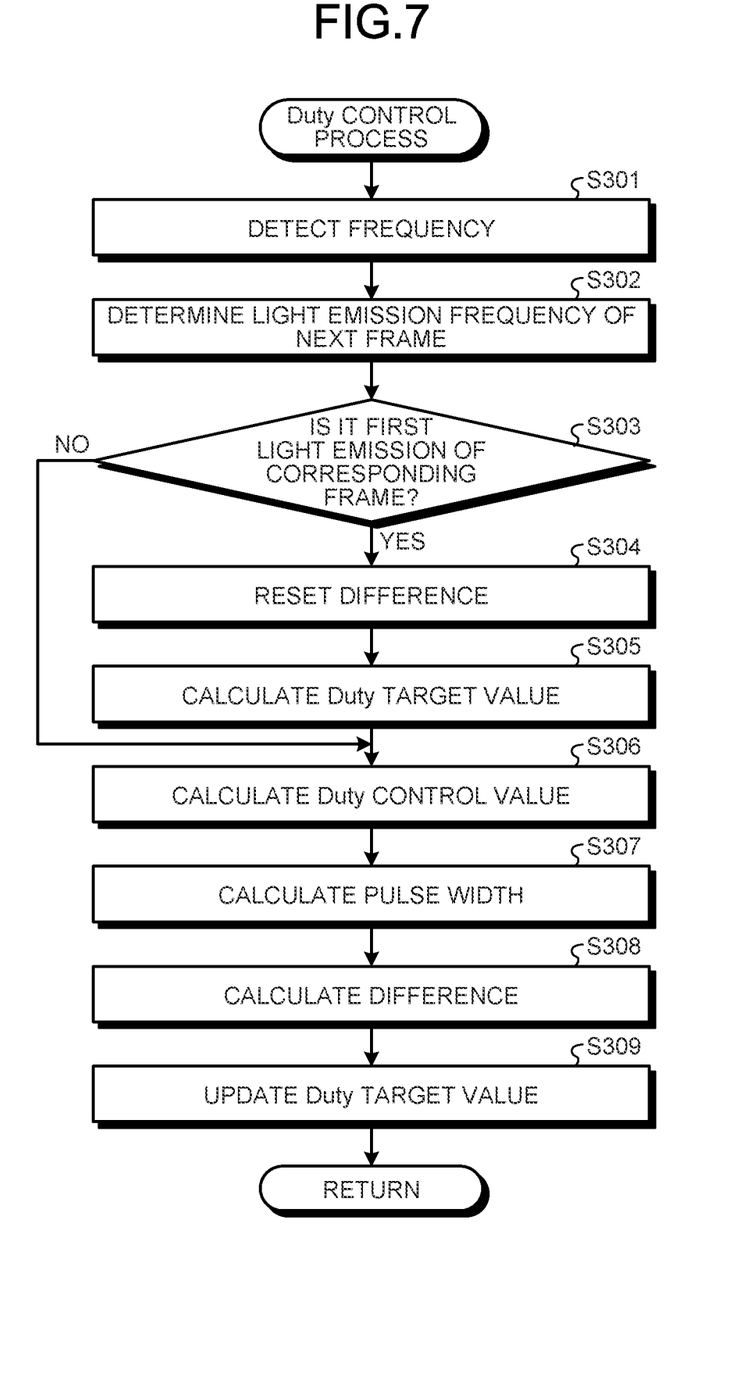
FIG. 7 is a flowchart illustrating an overview of a Duty control process in FIG. 6.

FIG. 7 is a flowchart illustrating an overview of the Duty control process at step S203 in FIG. 6.

As illustrated in FIG. 7, first of all, the detector 404*b* detects a frequency of vocal cords based on audio data that is input from the audio input device 3 (step S301).

Subsequently, the determination unit 404*c* determines a light emission period of the next frame of the imager 242 based on the frequency that is detected by the detector 404*b* (step S302).

Thereafter, the controller 405 determines whether it is the first light emission of the corresponding frame in the imager 242 (step S303). When the controller 405 determines that it is the first light emission of the corresponding frame in the imager 242 (YES at step S303), the endoscope system 1A moves to step S304 to be described below. On the other hand, when the controller 405 determines that it is not the first light emission of the corresponding frame in the imager 242 (NO at step S303), the endoscope system 1A moves to step S306 to be described below.

At step S304, the update unit 404*j* resets the difference between a Duty target value that is calculated by the third calculator 404*g* and a Duty control value that is calculated by the fourth calculator 404*h*.

Subsequently, based on the brightness evaluation value that is calculated by the first calculator 404*a*, the second calculator 404*d* calculates a Duty target value representing an intended value of a Duty ratio of the next frame of the imager 242 (step S305).

Thereafter, based on a pulse width at the time when the light source controller 404*f* causes the light source 51 to emit a pulse light and the light emission period that is determined by the determination unit 404*c*, the fourth calculator 404*h* calculates a Duty control value representing a Duty ratio at the time when the light source controller 404*f* actually controls the light source 51 (step S306).

Subsequently, based on the Duty target value that is input from the second calculator 404*d* and the light emission period that is input from the determination unit 404*c*, the third calculator 404*g* calculates a pulse width of each pulse at the time when the light source device 5 causes emission of a pulse light (step S307).

Thereafter, the fifth calculator 404*i* calculates a difference (carry over error) between the Duty target value that is calculated by the second calculator 404*d* and the Duty control value that is calculated by the fourth calculator 404*h* (step S308).

Subsequently, based on the error (carry over error) that is calculated by the fifth calculator 404*i*, the update unit 404*j* corrects (makes a reflection to) the Duty target value at the time when the light source 51 emits a pulse light next with respect to each pulse, thereby updating the Duty target value (step S309). After step S309, the endoscope system 1A returns to the main routine in FIG. 6.

Overview of Conventional Duty Control Process

Figure 8:
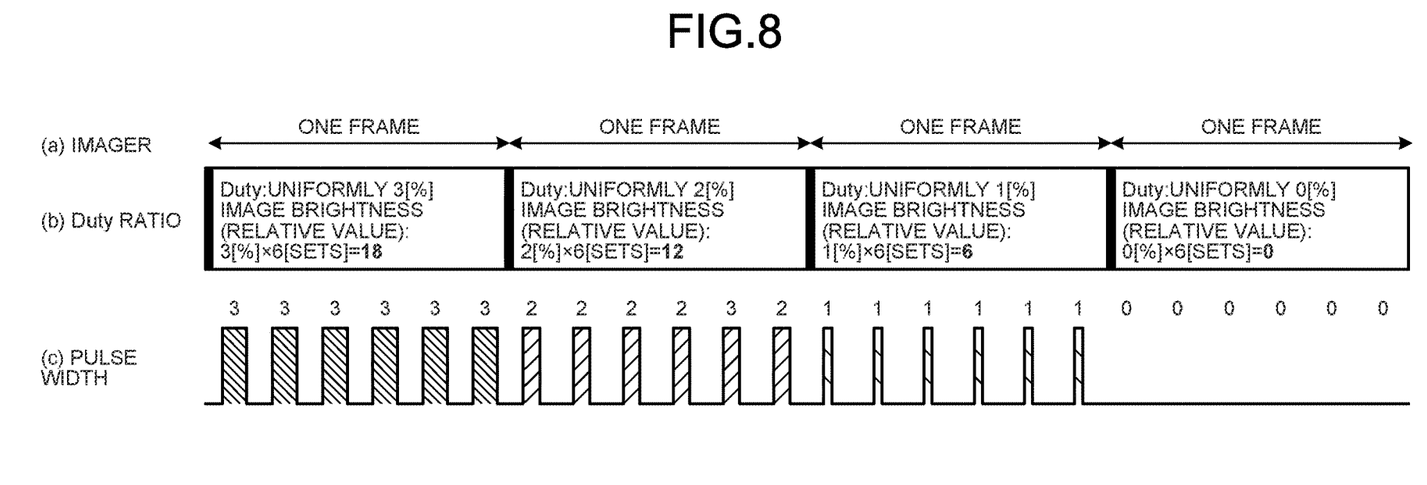
FIG. 8 is a timing chart illustrating an overview of pulse light emission that a conventional endoscope system executes.

A conventional Duty control process will be described. FIG. 8 is a timing chart illustrating an overview of the conventional Duty control process. In FIG. 8, from the top, (a) presents periods of one frame captured by the imager 242, (b) presents Duty ratios, and (c) presents pulse widths of pulse light.

As illustrated in FIG. 8, in the conventional Duty control process, to change the total exposure of brightness of an image from "18" to "17", the target value (Duty intended value) representing a Duty ratio realized by the light source 51 for making the image have intended brightness in the next frame of the imager 242 is 3%×(17/18)=2.83%. When there is however a restriction that a control value representing a Duty ratio enabling the light source controller 404*f* to control The light source 51 is controlled only on a percent to percent basis because of the circuit scale, or the like, the Duty ratios in one frame are controlled uniformly in the conventional Duty control process.

For this reason, as illustrated in FIG. 8, in the conventional Duty control process, in the next frame of the imager 242, the control value representing a Duty ratio is "2%" and the total exposure of brightness of the image is "12" (2%× 6(sets)). Thus, in the conventional Duty control process, gain processing of 1.42 (17+12) has to be performed on a video signal that is generated by the imager 242 in order to correct the difference between the target value and the actual control value. The gain processing has an effect on the S/N of the video signal. As a result, the conventional Duty control process leads to an unnatural image. For example, the conventional Duty control method leads to an image in which the noise volume significantly increases or decreases according to fluctuations in the distance in observing a living organism. For this reason, a technique enabling consecutive dimming control without causing an adverse effect of a S/N increase or decrease the gain processing even when the Duty control cannot ensure a sufficient resolution has been required. In other words, in the second embodiment, Duty ratios in one frame are not controlled uniformly (vary per pulse) and accordingly an image suitable as an observation image is acquired.

Specific Example of Duty Control Process

Figure 9:
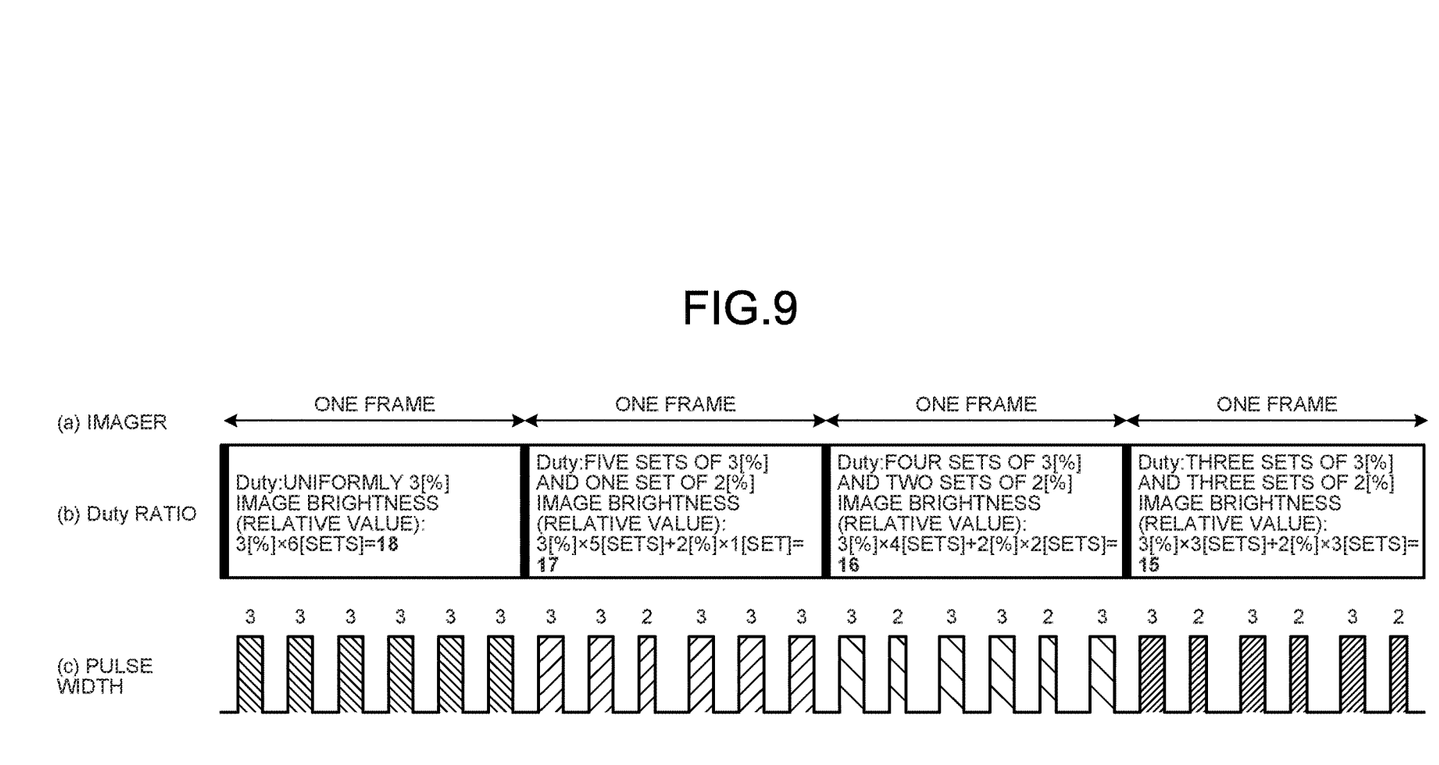
FIG. 9 is a timing chart illustrating an overview of pulse light emission that the endoscope system according to the second embodiment executes.

FIG. 9 is a timing chart illustrating an overview of the Duty control process according to the second embodiment. In FIG. 9, (a) presents periods of one frame captured by the imager 242, (b) presents Duty ratios, and (c) presents pulse widths of pulse light.

As illustrated in FIG. 9, first of all, based on a brightness evaluation value that is calculated by the first calculator 404*a*, the second calculator 404*d* calculates a Duty target value representing an aimed value of the Duty ratio of the next frame of the imager 242. For example, in the case where a brightness evaluation value (total exposure) of a previous frame is "18", a target value of the duty ratio is "3%", and a brightness evaluation value (total exposure) that is calculated by the first calculator 404*a* changes to "17", the second calculator 404*d*. calculates that a Duty target value of a current frame is "2.83%" (3%×(17/18)=2.83%). The fourth calculator 404*h* calculates that the first (first pulse) Duty control value is "3.00%" that is a value obtained by rounding the Duty control value to the closest integer.

Subsequently, based on the Duty target value that is input from the second calculator 404*d* and a light emission period that is input from the determination unit 404*c*, the third calculator 404*g* calculates a first (first pulse) pulse width at the time when the light source device 5 emits a pulse light. For example, when the first Duty control value is "3.00%" and the light emission period is "200 μsec", the third calculator 404*g* calculates that the first pulse width is "6

μsec". In this case, the third calculator 404g calculates a pulse width in a step size of an integral multiple (for example, 1 μsec) of a line period of the imager 242.

Thereafter, the fifth calculator 404i calculates that the difference (carry over error) between "3.00%" that is the Duty control value calculated by the fourth calculator 404h and "2.83%" that is the Duty target value calculated by the second calculator 404d is "0.17%" (3.00%−2.83%=−0.17%). In this case, based on the difference that is calculated by the fifth calculator 404i, the update unit 404l corrects (makes a reflection to) the Duty control value at the time when the light source 51 emits a pulse light next, thereby updating the second Duty control value to "2.66%" (2.83%−0.17%=2.66%). The fourth calculator 404h calculates that the second Duty control value is "3.00%" that is a value obtained by rounding the Duty control value to the closest integer (rounding 2.66% to 3.00%).

Subsequently, based on the Duty control value that is input from the fourth calculator 404h and the light emission period that is input from the determination unit 404c, the third calculator 404g calculates a second pulse width at the time when the light source device 5 emits a pulse light. For example, in the case where the second Duty control value is "3.00%" and the light emission period is "200 μsec", the third calculator 404g calculates that the second pulse width is "6 μsec".

Thereafter, the fifth calculator 404i calculates that the difference (carry over error) between "3.00%" that is the Duty control value calculated by the fourth calculator 404h and "2.66%" that is the Duty target value that is updated secondarily by the update unit 404j is "0.34%" (3.00%−2.66%=−0.34%). In this case, based on the difference that is calculated by the fifth calculator 404i, the update unit 404j corrects (makes a reflection to) the Duty target value at the time when the light source 51 emits a pulse light next, thereby updating the third Duty target value to "2.49%" (2.83%−0.34%=2.49%). The fourth calculator 404h calculates that the third Duty control value is "2.00%" that is a value obtained by rounding the Duty control value to the closest integer (rounding 2.49% to 2.00%).

In the case where the third Duty control value is "2.00%" and the light emission period is "200 μsec", the third calculator 404g calculates that the third pulse width is "4 μsec".

Thereafter, the fifth calculator 404i calculates that the difference (carry over error) between "2.00%" that is the Duty control value calculated by the fourth calculator 404h and "2.49%" that is the Duty target value that is updated thirdly by the update unit 404j is "+0.49%". In this case, based on the error that is calculated by the fifth calculator 404i, the update unit 404j corrects (makes a reflection to) the Duty target value at the time when the light source 51 emits a pulse light next, thereby updating the fourth Duty target value to "3.32%" (2.83%+0.49%=3.32%). The fourth calculator 404h calculates than the fourth control value is "3.00%" that is a value obtained by rounding the Duty control value to the closest integer (rounding 3.32% to 3.00%).

In the case, where the fourth Duty control value as "3.00%" and the light emission period is "200 μsec", the third calculator 404g calculates that the fourth pulse width is "6 μsec".

Thereafter, the fifth calculator 404i calculates that the difference (carry over error) between "3.00%" that is the Duty control value calculated by the fourth calculator 404h and "3.32%" that is the Duty target value that is updated fourthly by the update unit 404j is "+0.32%". In this case, based on the difference that is calculated by the fifth calculator 404i, the update unit 404j corrects (makes a reflection to) the Duty target value at the time when the light source 51 emits a pulse light next, thereby updating the fifth Duty target value to "3.15%" (2.83%+0.32%=3.15%). The fourth calculator 404h calculates that the fifth control value is "3.00%" that is a value obtained by rounding the Duty control value to the closest integer (rounding 3.15% to 3.00%).

In the case where the fifth Duty control value is "3.00%" and the light emission period is "200 μsec", the third calculator 404g calculates that the fifth pulse width is "6 μsec".

Thereafter, the fifth calculator 404i calculates that the difference (carry over error) between "3.00%" that is the Duty control value calculated by the fourth calculator 404h and "3.15%" that is the Duty target value that is updated fifthly by the update unit 404j is "+0.15%". In this case, based on the difference that is calculated by the fifth calculator 404i, the update unit 404j corrects (makes a reflection to) the Duty target value at the time when the light source 51 emits a pulse light next, thereby updating the sixth target value to "2.98%" (2.83%+0.15%=2.98%). The fourth calculator 404h calculates that the sixth Duty control value is "3.00%" that is a value obtained by rounding the Duty control value to the closest integer (rounding 2.98% to 3.00%).

In the case where the sixth Duty control value is "3.00%" and the light emission period is "200 μsec", the third calculator 404g calculates that the sixth pulse width is "6 μsec".

As described above, the light source controller 404f causes emission of pulse light using five sets of 3% that is Duty ratio and a set of 2% in the next frame or the imager 242, so that the average Duty ratio is 2.83% and the brightness evaluation value of the image can be "17". As described above, using the difference (carry over error) that is calculated by the fifth calculator 404i, the update unit 404j corrects (makes a reflection to) the Duty target value at the time when the light source 51 emits a pulse light next with respect to each pulse, thereby updating the Duty target value and thus enabling consecutive PWM control.

Back to FIG. 6, description of step S204 and the steps after step S204 will be continued.

At step S204, the light source controller 404f executes PWM control by driving the light source driver 52 based on the pulse width of each pulse that is calculated by the third calculator 404g.

Subsequently, the controller 405 determines whether light emission for the corresponding frame of the imager 242 completes (step S205). When the controller 405 determines that light emission for the corresponding frame of the imager 242 completes (YES at step S205), the endoscope system 1A moves to step S206 to be described below. On the other hand, when the controller 405 determines that light emission of the corresponding frame of the imager 242 does riot complete (NO at step S205), the endoscope system 1A returns to step S203 described above.

At step S206, the controller 405 determines whether an instruction signal for ending an examination on a living organism is input from the operation unit 403. When the controller 405 determines that the instruction signal for ending the examination on the living organism is input from the operation unit 403 (YES at step S206), the endoscope system 1A ends the process. On the other hand, when the controller 405 determines that the instruction signal for ending the examination on the living organism is not input from the operation unit 403 (NO at step S206), the endoscope system 1A returns to step S201 described above.

According to the second embodiment described above, because the third calculator 404g calculates a pulse width at the time when the light source 51 emits a pulse light next based on a Duty target value that is updated by the update unit 404j with respect to each pulse in one frame of the imager 242 and the light emission period and an approximation to the Duty target value is made, it is possible to obtain an observation image with brightness that is suitable for observation.

According to the second embodiment, because the third calculator 404g calculates a pulse width of each pulse in one frame based on the target value that is the average Duty ratio of the pulse light in the next frame of the imager 242, which is calculated by the second calculator 404d, and the light emission period, which is determined by the determination unit 404c, even if the Duty control by the light source controller 404f cannot ensure a resolution sufficiently, it is possible to perform consecutive dimming control without increasing or reducing the S/N ratio.

According to the second embodiment, using the difference (error) that is calculated by the fifth calculator 404i, the update unit 404j corrects (makes a reflection to) the Duty control value at the time when the light source 51 emits a pulse light next with respect to each pulse, thereby updating the Duty target value and thus enabling consecutive PWM control.

Other Embodiments

It is possible to form various embodiments by appropriately combining a plurality of elements disclosed in the endoscope systems according to the first and second embodiments of the disclosure described above. For example, some elements may be omitted from all the elements described with respect to the endoscope systems according to the first and second embodiments of the disclosure described above. Furthermore, the elements described with respect to the endoscope systems according to the first and second embodiments of the disclosure described above may be combined as appropriate.

In the endoscope systems according to the first and second embodiments of the disclosure, the "unit", "-er" and "-or" described above may be read as "means", "circuitry", or the like. For example, the controller may be read as a control means or a control circuitry.

The programs that the endoscope systems according to the first and second embodiments of the disclosure are caused to execute are recorded as installable or executable file data in a computer-readable recording medium, such as a CD-ROM, a flexible disk (FD), a CD-R, a digital versatile disk (DVD), a USB medium, or a flash memory, and are provided.

The programs that the endoscope systems according to the first and second embodiments are caused to execute may be stored in a computer that is connected to a network, such as the Internet, and may be configured to be downloaded via the network and thus be provided.

In the description of the flowcharts herein, the context of the process among steps clearly specified using expressions including "first of all", "thereafter", and "subsequently"; however, the order of the processes necessary to implement the disclosure is not uniquely determined by those expressions. In other words, the order of processes in the flowcharts described herein is changeable within a range without inconsistency.

According to the disclosure, an effect that it is possible to obtain an observation image with brightness that is suitable for observation.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An endoscope system comprising:
   a light source configured to emit a pulse light;
   an imager configured to capture an image on a frame by frame basis; and
   a processor configured to:
      determine a first duty target value representing a duty ratio of the pulse light to make an image that is captured in a next imaging frame have intended brightness;
      based on a frequency of vocal cords, determine a light emission period for a time when the pulse light is emitted;
      based on the first duty target value and the light emission period, determine a pulse width of the pulse light that is emitted next; and
      based on the light emission period and the pulse width, control the light source in light emission,
   wherein, as for the first duty target value,
      in a case of a first pulse in the imaging frame, the first duty target value is determined based on brightness of an image that is previously acquired, and
      in a case of a different pulse after the first pulse in the imaging frame, the first duty target value is determined based on:
         a second duty target value; and
         a carry over error,
         wherein the carry over error is a difference between the second duty target value of a pulse of light that is emitted one time before a current pulse and a duty control value representing an actual duty ratio of the pulse of light that is emitted one time before the current pulse.

2. The endoscope system according to claim 1, wherein the processor is configured to calculate the pulse width in a step size of an integral multiple of a line period of the imager.

3. The endoscope system according to claim 1, further comprising:
   an audio input portion configured to receive an input of a sound that is made by a living organism and thus generate an audio signal; and
   a detector configured to detect a frequency of vibrations of the vocal cords based on the audio signal that is generated by the audio input portion.

4. A control device configured to control a light source configured to emit a pulse light, the control device comprising:
   a processor configured to:
      determine a first duty target value representing a duty ratio of the pulse light to make an image that is captured in a next imaging frame have intended brightness;
      based on a frequency of vocal cords, determine a light emission period for a time when the pulse light is emitted;

based on the first duty target value and the light emission period, determine a pulse width of the pulse light that is emitted next; and based on the light emission period and the pulse width, control the light source in light emission, wherein, as for the first duty target value, in a case of a first pulse in the imaging frame, the first duty target value is determined based on brightness of an image that is previously acquired, in a case of a different pulse after the first pulse in the imaging frame, the first duty target value is determined based on:

a second duty target value; and a carry over error, wherein the carry over error is a difference between the second duty target value of a pulse of light that is emitted one time before a current pulse and a duty control value representing an actual duty ratio of the pulse of light that is emitted one time before the current pulse.

5. A method of controlling a light source configured to emit a pulse light, the method comprising:

determining a first duty target value representing a duty ratio of the pulse light to make an image that is captured in a next imaging frame have intended brightness;

based on a frequency of vocal cords, determining a light emission period for a time when the pulse light is emitted;

based on the first duty target value and the light emission period, determining a pulse width of the pulse light that is emitted next; and based on the light emission period and the pulse width, controlling the light source in light emission, wherein, as for the first duty target value, in a case of a first pulse in the imaging frame, the first duty target value is determined based on brightness of an image that is previously acquired, and in a case of a different pulse after the first pulse in the imaging frame, the first duty target value is determined based on:

a second duty target value; and a carry over error, wherein the carry over error is a difference between the second duty target value of a pulse of light that is emitted one time before a current pulse and a duty control value representing an actual duty ratio of the pulse of light that is emitted one time before the current pulse.

6. A non-transitory computer-readable recording medium with an executable program stored thereon, the program causing a processor to execute:

determining a first duty target value representing a duty ratio of a pulse light to make an image that is captured in a next imaging frame have intended brightness;

based on a frequency of vocal cords, determining a light emission period for a time when the pulse light is emitted;

based on the first duty target value and the light emission period, determining a pulse width of the pulse light that is emitted next; and based on the light emission period and the pulse width, controlling a light source in light emission, wherein, as for the first duty target value, in a case of a first pulse in the imaging frame, the first duty target value is determined based on brightness of an image that is previously acquired, and in a case of a different pulse after the first pulse in the imaging frame, the first duty target value is determined based on:

a second duty target value, and a carry over error, wherein the carry over error is a difference between the second duty target value of a pulse of light that is emitted one time before a current pulse and a duty control value representing an actual duty ratio of the pulse of light that is emitted one time before the current pulse.

* * * * *